Jan. 15, 1974  A. SAM  3,785,938
METHOD FOR MAKING ABRASIVE ARTICLES
Filed Nov. 5, 1970  3 Sheets-Sheet 1
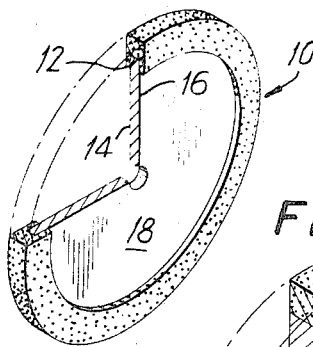
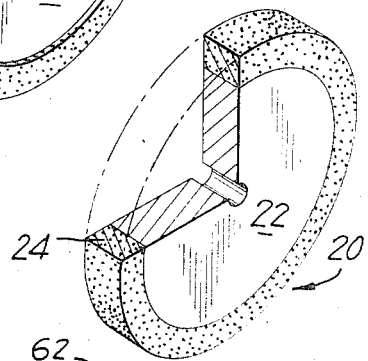
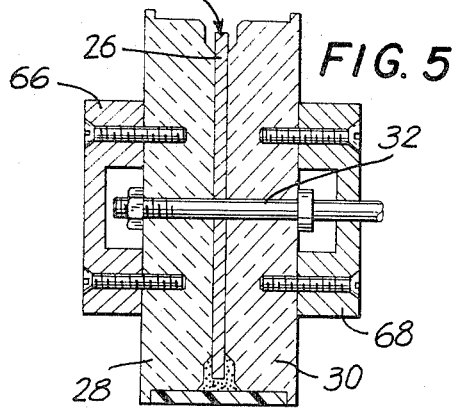
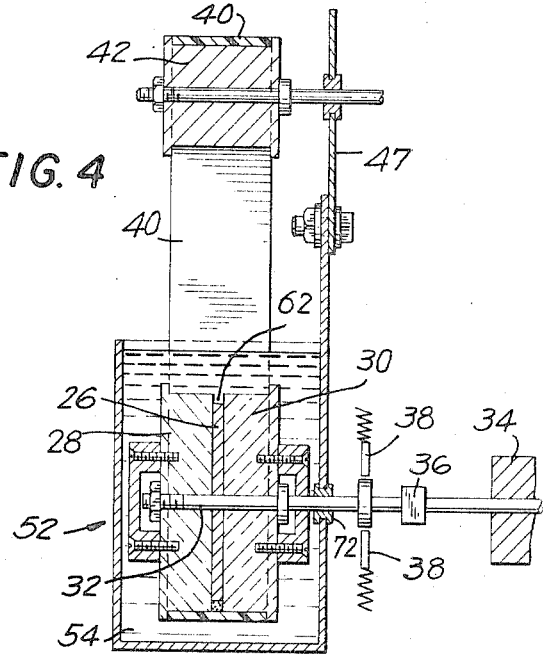
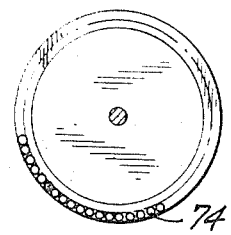
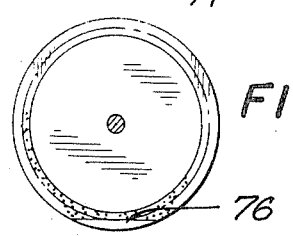
INVENTOR.
AHMAD SAM
BY
Lilling and Siegel
ATTORNEYS Jan. 15, 1974   A. SAM   3,785,938
METHOD FOR MAKING ABRASIVE ARTICLES
Filed Nov. 5, 1970   3 Sheets-Sheet 2

INVENTOR.
AHMAD SAM
BY
Lilling and Siegel
ATTORNEYS

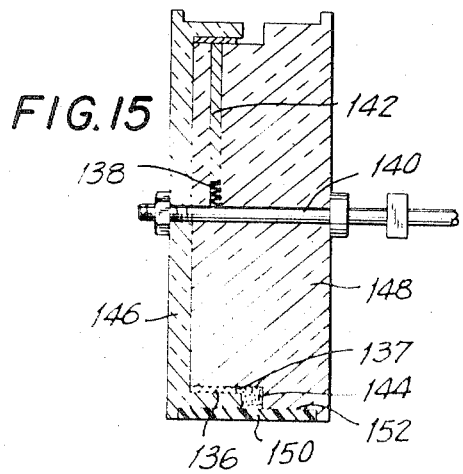
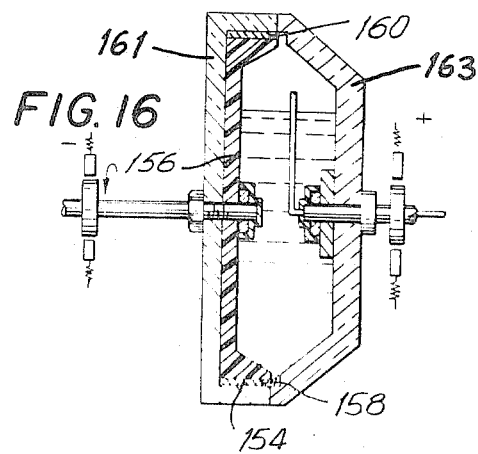
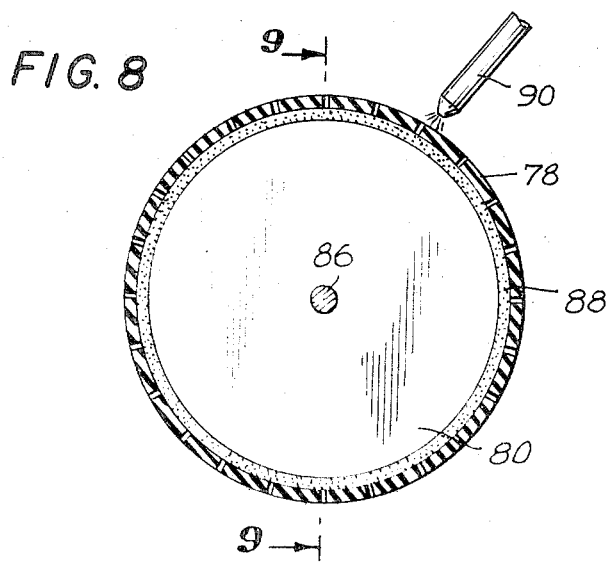
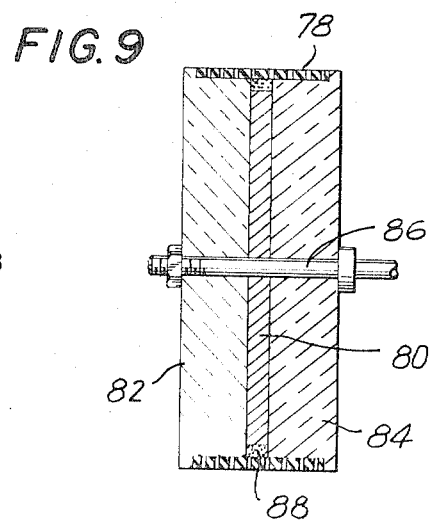
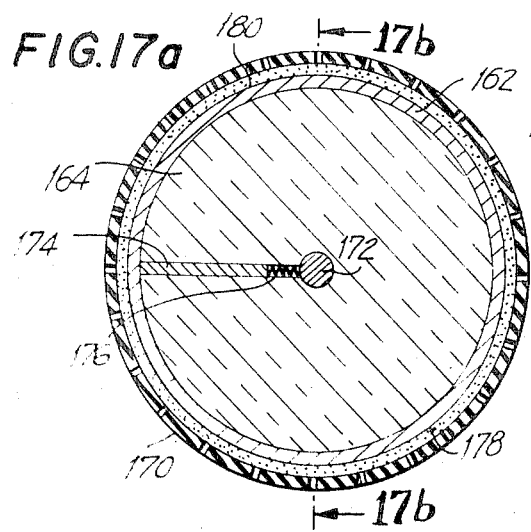
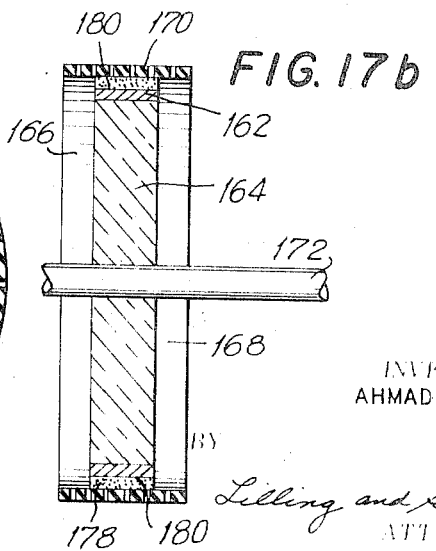

United States Patent Office
3,785,938
Patented Jan. 15, 1974

3,785,938
METHOD FOR MAKING ABRASIVE ARTICLES
Ahmad Sam, 671 Forest Ave., Paramus, N.J. 07652
Filed Nov. 5, 1970, Ser. No. 87,177
Int. Cl. C23b 5/48, 5/68
U.S. Cl. 204—16  39 Claims

ABSTRACT OF THE DISCLOSURE

Depositing abrasive particles, such as diamonds, silicon carbide, titanium carbide, aluminum oxide, or mixtures thereof, in a matrix of electrochemically deposited metals on the outer periphery and/or the adjacent marginal side portions of metal (or non-metals) blanks or wheels.

BACKGROUND OF THE INVENTION

Abrasive grinding wheels heretofore have been made by either a sintering process whereby the binding medium is metal or by a vitrified or clay-bonded process whereby wheels are made of fused clays. Other wheels are made using a shellac bond, rubber-bond or resinoid bond, however, no one bond makes the best wheel for a multitude of purposes. Generally, each type of bonded wheel has its particular fields of application.

In addition, grinding wheels can take the form of many shapes, but usually they are either of disk shape or cup shape. In the disk shape wheel, the effective abrasive grinding section extends entirely about the periphery whereas in the cup shape wheel the effective diamond grinding section extends about the outermost peripheral area. With respect to the present invention, we are generally concerned with a grinding wheel having a metal blank including a hub portion. The hub portion is usually provided with a central bore permitting same to be mounted on a shaft or spindle. The blank may suitably be of steel or other metal. Non-metal wheels suitable for electroplating may also be used. More specifically, it is what is carried on the periphery of the wheel in a position to make effective contact with a work piece with which the instant invention is primarily concerned. An effective grinding section which is the peripheral zone of the disc or wheel commonly has an abrasive thickness of from 10 mils to ¼ inch. It is this section which includes the abrasive grinding material, and the present invention includes methods and apparatuses for making such grinding disks and wheels. The invention also pertains to methods and apparatuses for making grinding belts and slicing band saws.

Accordingly, it is an object of the present invention to provide novel methods and apparatuses for making grinding wheels of disk shape and cup shape.

It is also an object of the invention to provide novel methods and apparatuses for making cutting wheels.

It is another object of the invention to provide novel methods and apparatuses for making grinding belts and band saws.

It is yet another object of the invention to provide novel methods and apparatuses for making side grinding wheels.

With the above and other objects in view which will appear as the description proceeds, the present invention resides in the novel methods and apparatuses hereinafter described and more particularly defined by the appended claims, it being understood that such changes in the specific embodiments of the hereindescribed invention may be made as come within the scope of the claims.

A better understanding of the invention will be had by the following detailed description when considered in connection and together with the accompanying drawings.

BRIEF DESCRIPTION OF THE DRAWINGS

FIG. 1 is a perspective view, partially broken away, illustrating a cutting wheel made in accordance with the invention;

FIG. 2 is a perspective view, partially broken away, of a grinding wheel made in accordance with the invention;

FIG. 3 is a front elevational view, partly in section, of one of the apparatuses for carrying out a process and method of the invention;

FIG. 4 is a sectional view, taken along the line 4—4 of FIG. 3;

FIG. 5 is a greatly enlarged view of the wheel fixture assembly, shown in FIGS. 3 and 4, for holding the core blank or base metal wheel upon which the abrasive (diamond) particles are deposited about its peripheral edge;

FIG. 6A is a side view of a wheel, illustrating inert beads in a modified form of fixture so as to partially fill the beveled part of the gap or groove;

FIG. 6B is a side view of another wheel, similar to that shown in FIG. 6A, illustrating a liquid to partially fill the beveled part of the gap or groove;

FIG. 8 is a side elevational view, partly in section, of a grinding wheel, made in accordance with another method of the invention wherein a circular band or ring is employed in lieu of a long belt;

FIG. 9 is a sectional view, along the lines 9—9 of FIG. 8;

FIG. 15 is a cross-sectional view of yet another embodiment of the invention for making cutting or slicing band saws, by means of either the method and apparatus of FIGS. 3–5, 7, or FIGS. 8 and 9;

FIG. 16 is a cross-sectional view of a further embodiment of the invention, for making band saws by means of the method and apparatus of FIGS. 13 and 14; and FIGS. 17a and 17b are substantially sectional views illustrating another modification of the invention wherein abrasive grinding belts may be made using a non-conductive inner wheel or blank, and the method and apparatus of either FIGS. 3–5, 7, or FIGS. 8 and 9.

DESCRIPTION OF THE PREFERRED EMBODIMENT

Figure 7:
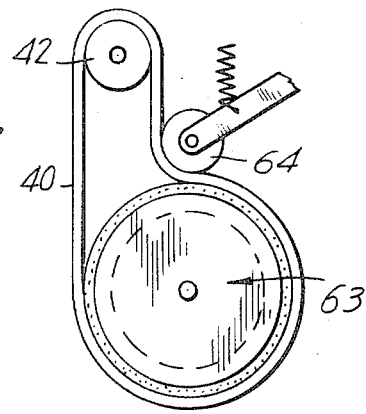
FIG. 7 is a sectional view of an apparatus similar to that shown in FIG. 3, but with an idle roller so as to increase the length of wrap about the grinding wheel.

Referring now to the drawings, and particularly to FIGS. 1 and 2 respectively, there is illustrated typical cutting and grinding wheels made in accordance with the present invention. As shown in FIG. 1, the cutting wheel 10 has abrasive particles deposited on three sides of the wheel, i.e., the outer peripheral edge 12 and also along both adjacent marginal outer side edges 14 and 16. The core or blank disc 18 is preferably made of a metal, but if desired, it may be a non-metallic material, such as plastic.

In FIG. 2, the grinding wheel 20 has a core or blank 22 and a peripheral grinding edge surface or section 24 provided only about the outer edge of the blank.

Referring now to FIGS. 3–5 and 7, more particularly to FIGS. 3–5, there is shown one apparatus for carrying out a method of the invention. In this arrangement, the grinding (or cutting) wheel 26 is disposed between opposed insulative plates or discs 28 and 30, preferably made of a transparent plastic such as Lucite, polystyrene, polycarbonate, etc. so as to enable one to visually observe the work piece. The plates are suitably clamped or otherwise locked together by means, such as a tie-rod 32. The tie-rod 32 is preferably driven by a motor 34 through suitable coupling means 36, as best shown in FIG. 4. Current carrying means, such as conventional spring loaded brushes 38 maintain contact with the tie-rod 32 which in operation represents the cathode of the electrolytic circuit of the invention.

In this particular arrangement wherein a belt 40 is employed, the upper wheel or roller 42 is used to provide tensioning to the belt. In this connection, a suitable tension adjustment may be provided, such as, for example, by slotted apertures 44 and 46 in the rear wall 47 and associated bolts 48 and 50. Such device, of course, provides the means for putting the belt about the rollers. As best shown in FIG. 3, the grinding wheel 26 is positioned within suitable tank means 52, preferably also made of a transparent material, such as glass, Lucite, or the like. The tank means 52 contains the necessary electrolytic solution 54. It is also within the invention to employ a tank with window means or with other means for monitoring or maintaining perception of the deposit. The anodes which form part of the electrolytic circuit are illustrated at 56 and 58 in FIG. 3. A curved slot 60 is suitably provided in the rear wall 47 so as to permit the upper wheel 42 to be disposed at an angle with respect to the vertical. For example, with the assembly operating in a clockwise fashion, it is preferable to have the upper wheel 42 disposed toward the right side of the curved slot 60. With the assembly operating counter-clockwise, it is preferable to position the upper wheel 42 toward the left side of the curved slot 60. The reason for such arrangement is that the belt 40 covers a greater percentage of the peripheral edge of the wheel in the direction which minimizes the possibility of the abrasive particles to be carried beyond the wheel which is to be coated with abrasive particles to the upper wheel 42 by means of adhering to the belt 40. Also, such arrangement precludes such particles from dropping out of the cavity or gap 62 between the plates 28 and 30 and the belt 40 and falling to the bottom of the tank 52.

As best shown in FIG. 7, a more preferred arrangement of the apparatus is illustrated. As shown therein, the belt 40 is wrapped about the grinding wheel assembly 63 for about 270° by means of an arrangement, such as a tension idle roller 64. The roller 64 eliminates the need for providing adjustment to the upper roller or wheel 42 and such an arrangement, minimizes the adherence of abrasive particles to the belt 40 and from being carried to the upper wheel. Also, this set-up precludes the particles from dropping to the bottom of the tank 52 since the abrasive particles are retained in the gap 62 for about 270°. If necessary, a plurality of idle rollers may be employed. In operation, as will be described hereinafter, it will be appreciated that the abrasive particles due to gravity primarily stay near the bottom of the grinding wheel assembly and in an imaginary quadrant in the direction of rotation of the grinding wheel assembly.

As best shown in FIG. 5, suitable insulative cover means 66 and 68 fastened respectively to the insulative plates or discs 28 and 30 protect the tie rod 32 and its associated nuts from also being plated with the depositing metal. If desired, suitable sealing means, such as O-ring (not shown) may be provided about the tie rod 32 which extends outwardly from the grinding wheel 26 for connection with the motor means. In addition, a suitable seal or packing, such as a nylon bushing 7 with associated O-rings seals the tie rod 32 where it passes through the rear wall of the tank means 52 (see FIG. 4). Likewise, if desired, suitable O-rings or rubber gaskets may be placed between cover means 66 and disc 28, and between cover means 68 and disc 30 to prevent the leakage of the electrolyte to the wheel fixtures.

In operation, a matrix of metal and discrete abrasive particles, such as diamond grains, is deposited on the desired surfaces of the wheel. The metal which is the carrier for the abrasive particles is electrolytically deposited on the wheel by means of a suitable circuit arrangement, such as a DC circuit wherein the grinding wheel 26 is the cathode and the deposited or bonded metal represents the anode. In the apparatus of FIGS. 3 and 4, the metal to be deposited is illustrated as electrodes 56 and 58. Such electrodes represent the anodes for the circuit and the cathode comprises the tie rod 32 and the grinding wheel 26 which is in intimate electrical contact therewith.

The electrolytic solution, of course, depends upon the metal to be deposited. For example, where nickel is the carrier metal, a preferrd electrolyte is nickel sulphamate solution [$Ni(SO_3NH_2)_2$], containing desired additives, such as a buffering agent, wetting agent, etc., which provide a suitable nickel deposit. With nickel, the preferred temperature range of the electrolytic solution is from about 40° C.–70° C. (102° F.–160° F.). As a general rule, temperatures above or below such preferred range give poorer quality of end product.

The current input of the DC power supply is preferably within the range of about 10–30 a.s.f. of apparent surface. The rate of deposition of the metal is controlled by the current density, and it should be noted that higher densities give poor quality of the deposited metal, whereas at lower densities than 10 a.s.f. fewer particles are embedded in the metal because insufficient metal is deposited on the wheel.

The concentration of abrasive particles in the matrix may also be controlled by varying the amount of the abrasive in contact with the wheel, the particle size, the current density, the speed of rotation of the wheel and by whether or not the mode of rotation of the wheel is interrupted or continuous.

With respect to particle size, the smaller the particles, the higher the concentration; and with respect to current density, the higher the current density, the lower the concentration. To low current densities also lower the abrasive concentration by precluding sufficient build-up of the deposited metal which is necessary to adequately anchor and hold the abrasive particles in place.

With respect to the speed of rotation, the higher the speed, the lower the concentration of particles. In addition, where the mode of operation of the wheel is one of interrupted rotation, the higher the concentration of particles.

Preferably, the electrolyte is stirred on air agitated during operation or otherwise circulated so as to provide a uniform deposition of the metal and so that the deposited metal is replenished on the cathode.

With respect to operational procedures, as the cutting-grinding wheel assembly rotates, the abrasive particles move in the gap 62 about the peripheral surface of the wheel to be plated and gradually as the metal is deposited, particles are bonded therewith and built up uniformly about the periphery of the wheel. The build up of the deposited metal and particles is achieved in a sense by the cumulative effect of building up layers.

It will be appreciated that the belt 40 is preferably made of an inert non-conductive material, such as thermoplastics, rubber, coated metals, etc. It could be either porous or non-porous to the electrolyte. A preferred speed of rotation of the grinding wheel assembly is about 0.05 to 0.25 r.p.m. A more preferred rate is about 0.2 r.p.m. Of course, the temperature of the elecyrolytic solution may be maintained by suitable immersion heaters (not shown). With respect to the size of the abrasive particles, such as diamond grains, particles ranging from about 16 mesh to about 600 mesh (1190 micron to 30 micron) are suitable. Theoretically, all commercially available sizes could be utilized although the above range is preferable. In a like manner, the invention is applicable to any size blank or wheel diameter, as well as thickness. For example, wheel diameters as large as about 8" have been utilized and wheel thicknesses as thin as a few thousandths of an inch have been utilized by the method and apparatus of the invention to produce commercially acceptable abrasive wheels, such as diamond grinding wheels.

In FIGS. 6A and 6B, there is shown modifications of the process wherein suitabe beads 74, such as glass beads, are employed in the gap beveled part of the gap area so as to aid in filling the space between the non-conductive plates handling the sandwiched wheel. In FIG. 6B, a suitable liquid, such as mercury 76, may be employed to cause floatation of the adhesive particles so as to facilitate the electro-plating process and aid in urging the abrasive particles toward the wheel's peripheral surfaces to be plated.

In FIGS. 8 and 9, a alternate apparatus is illustrated wherein the belt 78 is an elastic band in a partly stretched condition which completely encircles the wheel assembly which includes the blank 80 and the outer plates 82 and 84 held together by suitable tie rod means 86. In such construction, the belt 78 which is porous permits the electrolytic solution to pass therethrough. The abrasive particles are retained in the gap 88 and such overall assembly may be utilized in the tank means 52 of the apparatus of FIGS. 3, 4 and 7. As best shown in FIG. 8, a fluid jet 90 may be employed for directing a stream of fluid, preferably the electrolytic solution itself to the wheel assembly so as to promote more uniform plating of the wheel being made and to aid in providing uniformity of concentration of the abrasive particles about the peripheral surface of the wheel. Such a fluid jet is preferred in applications where the ratio of wheel thickness to size of abrasive particle is small. The method and apparatus of FIGS. 8 and 9 are preferred where thin wheels of the order of about .003" to about .125" are desired, whereas the method and apparatus of FIGS. 3–5 and 7 lends itself and is better suited for thicker grinding wheels.

Figure 10:
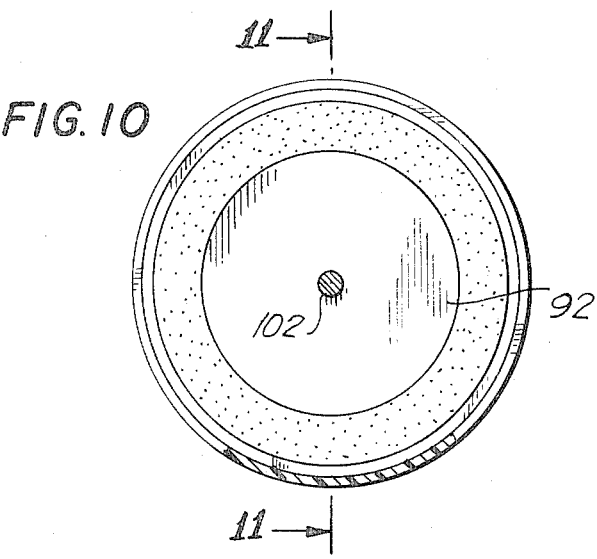
FIGS. 10 and 11 are generally sectional views, and illustrate side grinding wheels which can be made in accordance with the method and apparatus of FIGS. 8 and 9, or with the method and apparatus of FIGS. 3–5.
Figure 11:
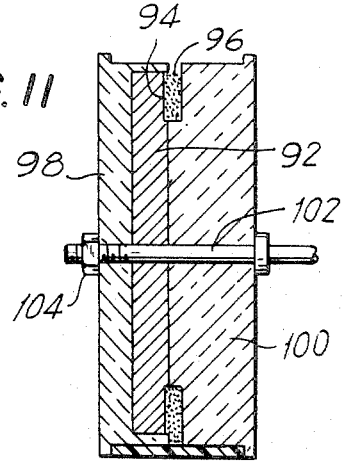
Figure 12:
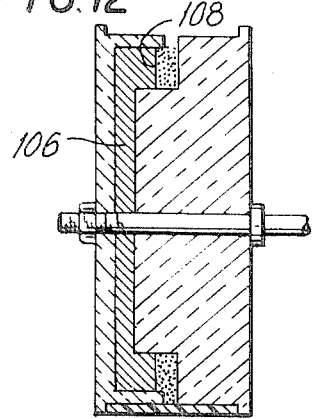
FIG. 12 is a sectional view showing a cup shape wheel made in accordance with either the method and apparatus of FIGS. 8 and 9, or FIGS. 3–5.

Illustrated in FIGS. 10 and 11 is a side grinding wheel 92 comprising a metal blank having its outer marginal or peripheral edge 94 suitably plated and coated with the abrasive particles retained in the gap or spacing 96 between the blank and one of the non-conductive plates 98 and 100 forming the sandwiched wheel assembly. The assembly, in a like manner as indicated hereinbefore in connection with the wheel assembly of FIGS. 3–5, is suitably held together by a tie-rod 102 and associated hardware, such as the end nut 104. It will be appreciated that such side grinding wheel 92 can be made using either the method and apparatus of FIGS. 8 and 9, or the method and apparatus shown in FIGS. 3–5 and 7. It will be appreciated that the abrasive coated marginal side area 94 of the wheel 92 may be varied by changing the size of the gap or spacing 96. If desired, the gap can be increased to cover the entire side surface of the wheel 92. In a like manner, FIG. 12 illustrates and shows another arrangement wherein a cup-shaped grinding wheel 106 is made with a similar fixture assembly. Of course, with such arrangement, the abrasive particles are deposited on the outer peripheral side edge 108 of the cup-shaped blank.

Figure 13:
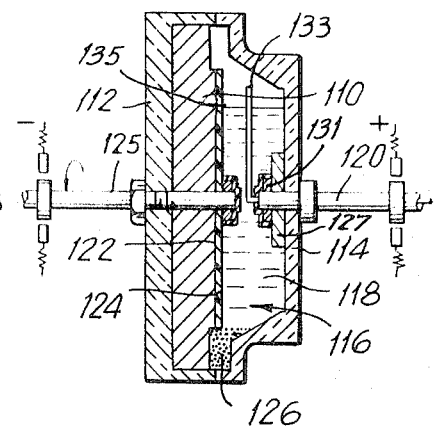
FIG. 13 is a sectional view representing a side grinding wheel made in accordance with yet another method of the invention, wherein the electrolyte is self-contained within a cavity surrounding the area to be plated.
Figure 14:
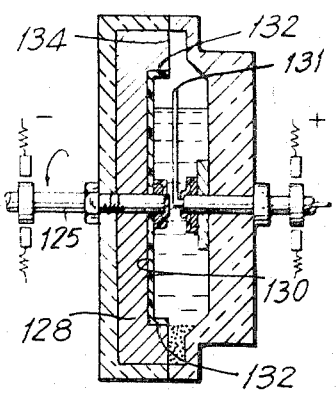
FIG. 14 is a sectional view similar to that of FIG. 13, except that a cup shape wheel is shown.

With reference to FIGS. 13 and 14, a further method and apparatus of the invention is illustrated wherein the electrolytic solution is self-contained within a cavity provided in the fixture or wheel assembly. As shown in FIG. 13, a metal blank 110 is suitably fixedly disposed between non-conductive elements 112 and 114 forming therebetween a cavity 116 for the electrolytic solution 118. Such assembly, of course, is suitably held fixedly together in a leakproof manner by suitable clamping means (not shown) disposed about the peripheral marginal edge. For example, suitable nuts and bolts may be provided about flanges extending radially outwardly from the joint area.

The central core area 122, including the shaft or rod 125 and associated nut holding the blank 110 to the element 112, is masked off by means of a suitable non-conductive coating 124 which may be applied by brushing it on or the coating may simply be some sort of a masking tape. It should be noted that due to gravity, the abrasive particles are retained in the gap or area 126 formed between the two elements 112 and 114. With such apparatus, the amount of abrasive particles to be deposited should be provided in place in sufficient quantity at the start of the process so that the fixture need not be resupplied during operation which may entail disassembly of the unit. If desired, suitable means (not shown) may be provided for adding additional particles during use and without the need for disassembly. Suitable anode means is shown at 127 and same is held to the element 114 by means of the shaft 120, which is hollow in construction, and a cooperatively associated nut 131. Inasmuch as gases are released during the operation of the apparatus, suitable vent means 133, in the form of a tube or pipe, extends from above the electrolyte level 135 to the atmosphere so as to vent such gases from the free space above the level of the electrolyte. The apparatus of FIG. 14 illustrates a similar assembly for use in making cup-shaped wheels 128. Of course, with such structure, the masked off portion comprises not only the central core area 130, but also the inner peripheral edge portion 132 adjacent the outer peripheral side edge 134 being coated.

In FIG. 15, there is shown a slicing band saw 136 having abrasive particles deposited along an edge 137 thereof. In such a construction, electrical contact is made at the band saw 136 by means of a spring loaded contact pin or rod assembly. The spring 138 is disposed between the conductive tie-rod 140 and the contact rod 142. The abrasive particles are, of course, suitably disposed within the gap 144 formed between the non-conductive elements 146 and 148. This assembly may obviously be employed with either the method and apparatus of FIGS. 3–5, 7 or with the method and apparatus of FIGS. 8 and 9. The belt 150, as in the other embodiments, is suitably maintained in place by a peripheral groove or recess 152 formed in and by the elements 146 and 148. Alternatively, the belt may be replaced by a porous elastic or rigid ring as shown in FIGS. 8 and 9.

In FIG. 16, a cutting band saw 154 is made by means of the method and apparatus of FIGS. 13 and 14. The fixture assembly, that is members 156, 161 and 163 are made of a non-conductive material, preferably a transparent plastic or the like. Special contact means, such as described hereinafter with respect to FIG. 17a connect the band saw 154 to the cathode of the power source. As in the case of the band saw of FIG. 15, abrasive particles which are retained in the gap 158 are deposited on the edge 160 of the band saw blade being formed. Such band saws of the invention are therefore provided with a uniformly deposited cutting edge capable of cutting or slicing through many materials which are very difficult to cut, such as glass, ceramic elements, hard metals and alloys thereof, masonry, carbides, aluminum oxide, quartz, or the like.

FIGS. 17a and b further illustrate yet another modification of the invention wherein grinding belts can be made by either the method and apparatus of FIGS. 3–5 and 7, or that shown in FIGS. 8 and 9. The grinding belt shown as 162, preferably made of a thin metal sheet, such as stainless steel, bronze, etc., is disposed about a suitable core wheel 164, preferably of a non-conductive material, such as plastic. The grinding belt 162 is retained in place by means of the end plates 166 and 168, and in this particular arrangement, a complete porous belt 170 is positioned about the end plates 166 and 168. Of course, with the method and apparatus of FIGS. 3–5 and 7, the belt need not necessarily be of the porous type and it would be longer inasmuch as it must be disposed over other wheels, such as the wheel 42 of FIGS. 3 or 7. In the embodiment shown herein, electrical contact is made with the conductive tie-rod 172 by means of a suitable contact rod 174 and a compression spring 176 positioned between the rod 174 and the tie-rod 172. A gap 178 between the outside belt 170 and the grinding belt 162 contains the abrasive particles to be deposited on the wide outer surface 180 of the grinding belt 162.

In the alternate embodiments of the invention wherein a porous belt or ring is employed, suitable elastic material, such as a woven or non-woven band or tape may be used. For example, one such material which provides excellent results is a woven stretchable elastic compositional material having about 29% rubber and 71% nylon. If necessary, this stretchable elastic may be lined with a suitable micro-porous filter cloth particularly where the abrasive grains are too small (140–170 mesh or smaller) to retain the particles. Other types of materials which also may be employed in the practice of the invention are porous porcelain, porous clay or ceramic, and porous plastic, etc. Such material would, of course, form a rigid band or ring but otherwise would perform no different than an elastic porous band or ring.

Although not shown herein, it is within the scope of this invention, that the gap between the plates or elements of the wheel assemblies containing the abrasive particles can be formed by other configurations, such as a groove or recess within the belt itself. However, with the arrangements illustrated herein, a uniform and constant depth of deposit is assured. The gaps shown herein may also be V-shape in form or be beveled, if desired, so as to facilitate migration of the abrasive particles within the space or gap between the plate elements.

It will be appreciated that the abrasive material used in the practice of the invention is generally natural or synthetic diamonds between about 16 and about 600 mesh (1190 micron to 30 micron). Other synthetic or natural abrasive materials such as silicon carbide, titanium carbide, tungsten carbide, boron nitride, titanium, diboride, and aluminum oxide can also be used in the practice of the invention. A mixture of diamonds and less expensive abrasives may be desired and such mixture would also be efficient as well as more economical. If desired, non-abrasive grains such as mica or molybdenum disulfide may be mixed with the abrasive for special reasons such as reducing friction, etc.

It should also be understood that the addition of abrasive particles, such as diamonds, to the cavity surrounding the blank wheel or belt is done at any stage during the formation of the peripheral matrix. Generally, it is done after the electrolyte is added to the tank or other cavity holding same, and thereafter as the supply of the abrasive particles diminishes, a slurry is made up of the electrolyte and the abrasive particles and same is transferred to the cavity between the belt 40 and the plates 28 and 30 of FIG. 4 with a suitable dispenser (or a glass or plastic funnel), such as a medicine dropper. In the apparatus of FIGS. 8 and 9, the elastic ring or belt 78 is slid off the gap 88 on the top portion, and the abrasives are added. The belt is then restored to its proper position so that the apparatus is then ready for use.

As a general rule, from about ⅛ to about ¼ of the space between the plates is filled with the abrasives for the apparatus of FIGS. 3, 4, 7, 8 and 9 and more if it is added as it is deposited. If a rigid ring is used for the embodiments of FIGS. 13, 14 or 16 are employed, then the abrasives should be introduced all at once in dry form at the time the assembly is put together. Visual observation of the abrasive movement and the progress of the matrix formation is accomplished by employing a suitable light source in back of the wheel assembly and observing through the transparent walls of the tank and the plates 28 and 30. The movement of the abrasive is most interesting in that due to gravity, etc. they tend not to travel beyond the quadrant in which they are disposed.

The following examples are illustrative of wheels of the types shown in FIGS. 1 and 2 and made in accordance with the principles of the invention. The abrasive used in all of the following examples were natural diamonds. In Examples 1, 2, 5 and 6, the apparatus, of FIGS. 8 and 9 was employed. In Example 5, the apparatus of FIGS. 3–5 was used; and in Example 6, the apparatus of FIG. 7 was used. The rotation was continuous at 0.2 r.p.m. in Examples 1, 2 and 6 and it was interrupted at 0.1 r.p.m. in Examples 3, 4 and 5.

EXAMPLE NO. 1

| | |
|---|---|
| Wheel (disc) diameter | 4.763". |
| Wheel thickness | 0.016". |
| Wheel thickness at cutting edge (includes thickness and deposit on both sides) | 0.020". |
| Depth of matrix (bonded deposit) | 120 mils. |
| Current | 20 ma. |
| Time | 196 hrs. |
| Weight of abrasives (diamond) used | 0.580 gram. |
| Particle (diamond) size: | |
| ½ | 60–80 mesh. |
| ½ | 80–100 mesh. |
| Volume of matrix | 0.0359 in.³ |
| Volume of diamond | 0.0100 in.³ |
| Percentage of diamond by volume | 27%. |
| Volume of nickel | 0.0259 in.³ |
| Cathode efficiency | 90%. |

EXAMPLE NO. 2

| | |
|---|---|
| Wheel diameter | 4.763". |
| Wheel thickness | 0.016". |
| Wheel thickness at cutting edge (includes thickness of deposit of both sides) | 0.020". |
| Depth of matrix (bonded deposit | 62 mils. |
| Current | 20 ma. |
| Time | 100 hrs. |
| Weight of abrasive (diamond) used | 0.300 gram. |
| Particle (diamond) size: | |
| ½ | 60–80 Tyler. |
| ½ | 80–100 Tyler. |
| Volume of matrix | 0.0185 in.³ |
| Volume of diamond | 0.0052 in.³ |
| Percentage of diamond by volume | 28%. |
| Volume of nickel | 0.0133 in.³ |
| Cathode efficiency | 91%. |

EXAMPLE NO. 3

| | |
|---|---|
| Wheel diameter | 4⅞". |
| Wheel thickness | ⅛". |
| Depth of matrix (diamonds) used) | 50 mils. |
| Current | 0.14 ampere. |
| Time | 69 hrs. |
| Particle size (diamonds) | 140–170 mesh. |
| Weight of the diamond | 1.65 grams. |
| Volume of matrix | 1.56 cm.³ |
| Concentration of the diamond by volume | 30%. |
| Weight of the carrier (nickel) | 9.78 grams. |
| Cathode efficiency | 93%. |

EXAMPLE NO. 4

| | |
|---|---|
| Wheel diameter | 4⅞". |
| Wheel thickness | ⅛". |
| Depth of matrix | 47 mils. |
| Current | 0.14 ampere. |
| Time | 50 hrs. |
| Particle size (diamonds) | 325–400 mesh. |
| Weight of diamonds | 2.5 grams (12.5 karats). |
| Volume of matrix | 1.476 cm.$^3$. |
| Volume of diamonds | 0.712 cm.$^3$. |
| Percentage of diamond | 48.2%. |
| Weight of carrier (nickel) | 6.80 grams. |
| Cathode efficiency | 90%. |

EXAMPLE NO. 5

| | |
|---|---|
| Wheel diameter | 7.75". |
| Wheel thickness | 0.035". |
| Wheel thickness at cutting edge (includes thickness and deposit on both sides) | 0.055". |
| Depth of matrix (bonded deposit) | 0.125". |
| Current | 90 ma. |
| Time | 205 hrs. |
| Particle size: | |
| ½ | 40–50 mesh. |
| ½ | 50–60 mesh. |
| Weight of diamond used | 2.595 grams. |
| Volume of matrix | 0.169 in.$^3$ or 2.77 cm.$^3$. |
| Percentage of diamond by volume | 27%. |
| Cathode efficiency | 90%. |

EXAMPLE NO. 6

| | |
|---|---|
| Wheel diameter | 4.763". |
| Wheel thickness | 0.008". |
| Wheel thickness at cutting edge (includes thickness and deposit on both sides) | 0.012". |
| Depth of matrix (bonded deposit) | 0.054". |
| Current | 0.012 ma. |
| Time | 76 hrs. |
| Particle size (diamonds) | 140–170 mesh. |
| Weight of diamond used | 0.208 gram. |
| Volume of matrix | 0.160 cm.$^3$. |
| Volume of the diamond | 0.0592 cm.$^3$. |
| Percentage of diamond | 37%. |
| Cathode efficiency | 92%. |

It should be noted that the above-described examples, modifications and embodiments of the invention are not to be construed as specifically limiting the invention to the precise and detailed specific structures shown in the figures and as described herein. Actually, a variety of constructions and arrangements for making such metal bonded abrasive elements may be employed and all such, within the broad scope and teachings of the present invention, are intended to be included and comprehended herein. For example, in special applications the matrix may contain discrete non-abrasive particles having certain properties, such as catalytic, semi-conductivity, radioactivity, fissionability, explosiveability, fluoresence, etc.

What is claimed is:

1. A process for the manufacture of an abrasive element having a continuous area of metal bonded abrasive material to at least one surface thereof, comprising:
   (a) mounting a base element between a pair of non-conductive elements for rotation while at least partially immersed in an electrolytic solution of metallic ions;
   (b) maintaining a zone or gap between said pair of non-conductive elements and said base element for retaining therebetween in close proximity to said surface a concentration of abrasive particles by means of an endless drive belt of inert material encircling at least a portion of the mounting for said base element;
   (c) exposing the surface of the base element to which abrasive material is to be bonded, at least periodically, to said concentration of abrasive particles retained in close proximity to said surface;
   (d) maintaining a current in said solution to effect the uniform electro-depositing of said abrasive particles onto said surface at a predetermined rate.

2. The process of claim 22, wherein said mounting includes a shaft rotatable by separate drive means.

3. The process of claim 22, wherein said endless belt is porous.

4. The process of claim 22, wherein said endless belt is elastic.

5. The process of claim 1, wherein said base element is the cathode for the electrolytic solution and an electrode of the metal to be deposited in said solution comprises the anode.

6. The process of claim 1, wherein said rotation is interrupted or discontinuous.

7. The process of claim 1, wherein said rotation is continuous.

8. The process of claim 1, wherein said current is of the direct current type.

9. The process of claim 1, wherein said solution is stirred or circulated during operation.

10. The process of claim 1, wherein said abrasive material comprises abrasive particles ranging in size from about 16 mesh to about 600 mesh.

11. The process of claim 1, wherein the metal bonded abrasive material deposited comprises nickel and diamonds.

12. The process of claim 1, wherein the electrolytic solution comprises nickel sulphamate.

13. The process of claim 1, wherein the electrolytic solution is maintained at a temperature from about 40° C. to about 70° C.

14. The process of claim 1, wherein the current in said solution is from about 10 to about 30 amperes per square foot of apparent surface.

15. The process of claim 1, wherein said base element is rotated within the range 0.05–0.25 r.p.m.

16. The process of claim 1, wherein said abrasive element is a grinding wheel and the surface comprises the outer peripheral surface of said base element.

17. The process of claim 1, wherein said abrasive element is a grinding wheel and the surface comprises the outer peripheral surface and at least one of the adjacent outer side edges of said base element.

18. The process of claim 1, wherein said abrasive element is a grinding belt and the surface comprises the outer side of said base element.

19. The process of claim 1, wherein said abrasive element is a band saw and the surface comprises an edge of said base element.

20. The process of claim 1, wherein said abrasive element is a side grinding wheel and the surface comprises a side edge of said base element.

21. The process of claim 1, wherein said abrasive element is a circular cutting saw and the surface comprises the outer peripheral surface of said base element.

22. A process for the manufacture of an abrasive element having a continuous area of metal bonded abrasive material to at least one surface thereof, comprising:
   (a) mounting a base element between a pair of non-conductive elements for rotation while at least partially immersed in an electrolytic solution of metallic ions;
   (b) maintaining a zone or gap between said pair of nonconductive elements and said base element for retaining therebetween in close proximity to said surface a concentration of abrasive particles by means of an endless belt of inert material completely encircling the mounting for said base element;

(c) exposing the surface of the base element to which abrasive material is to be bonded, at least periodically, to said concentration of abrasive particles retained in close proximity to said surface;

(d) maintaining a current in said solution to effect the uniform electro-depositing of said abrasive particles onto said surface at a predetermined rate.

23. The process of claim 22, wherein, said base element is the cathode for the electrolytic solution and an electrode of the metal to be deposited in said solution comprises the anode.

24. The process of claim 22, wherein said rotation is interrupted or discontinuous.

25. The process of claim 22, wherein said rotation is continuous.

26. The process of claim 22, wherein said current is of the direct current type.

27. The process of claim 22, wherein said solution is stirred or circulated during operation.

28. The process of claim 22, wherein said abrasive material comprises abrasive particles ranging in size from about 16 mesh to about 600 mesh.

29. The process of claim 22, wherein the metal bonded abrasive material deposited comprises nickel and diamonds.

30. The process of claim 22, wherein the electrolytic solution comprises nickel sulfamate.

31. The process of claim 22, wherein the electrolytic solution is maintained at a temperature from about 40° C. to about 70° C.

32. The process of claim 22, wherein the current in said solution is from about 10 to about 30 amperes per square foot of apparent surface.

33. The process of claim 22, wherein said base element is rotated within the range 0.05–0.25 r.m.p.

34. The process of claim 22, wherein said abrasive element is a grinding wheel and the surface comprises the outer peripheral surface of said base element.

35. The process of claim 22, wherein said abrasive element is a cutting wheel and the surface comprises the outer peripheral surface and at least one of the adjacent outer side edges of said base element.

36. The process of claim 22, wherein said abrasive element is a grinding belt and the surface comprises the outer side of said base element.

37. The process of claim 22, wherein said abrasive element is a band saw and the surface comprises an edge of said base element.

38. The process of claim 22, wherein said abrasive element is a side grinding wheel and the surface comprises a side edge of said base element.

39. The process of claim 22, wherein said abrasive element is a circular cutting saw and the surface comprises the outer peripheral surface of said base element.

References Cited
UNITED STATES PATENTS

| | | | |
|---|---|---|---|
| 3,205,624 | 9/1965 | Weiss | 204—16 |
| 3,281,996 | 11/1966 | Cuklanz | 204—16 |
| 3,488,892 | 1/1970 | Benner et al. | 204—16 |
| 2,784,536 | 3/1957 | Barron | 204—16 |
| 2,391,206 | 12/1945 | Van Der Pyl | 204—16 |
| 3,046,204 | 7/1962 | Barron | 204—16 |

THOMAS TUFARIELLO, Primary Examiner

U.S. Cl. X.R.

51—309; 204—212